Patented Dec. 25, 1923.

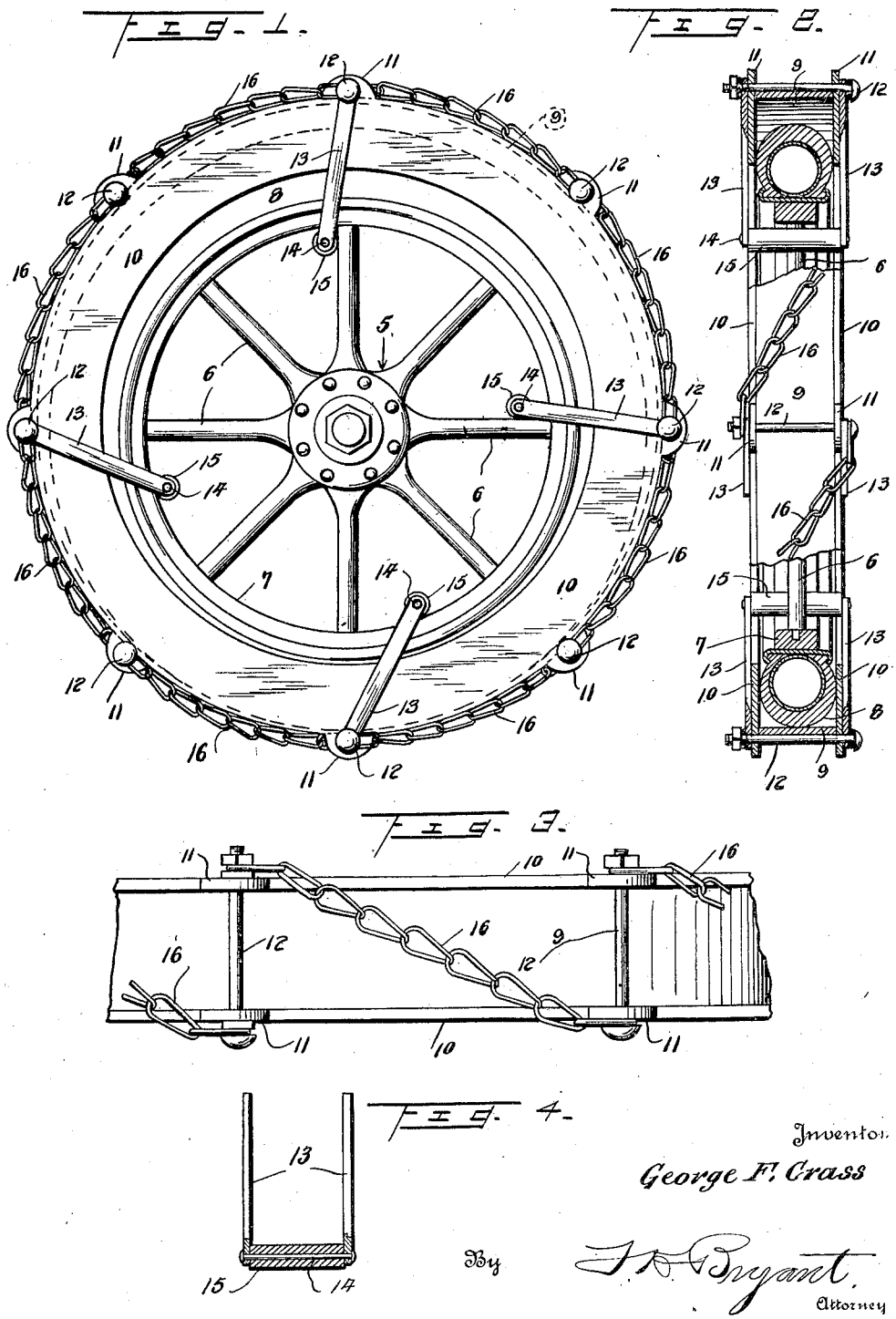

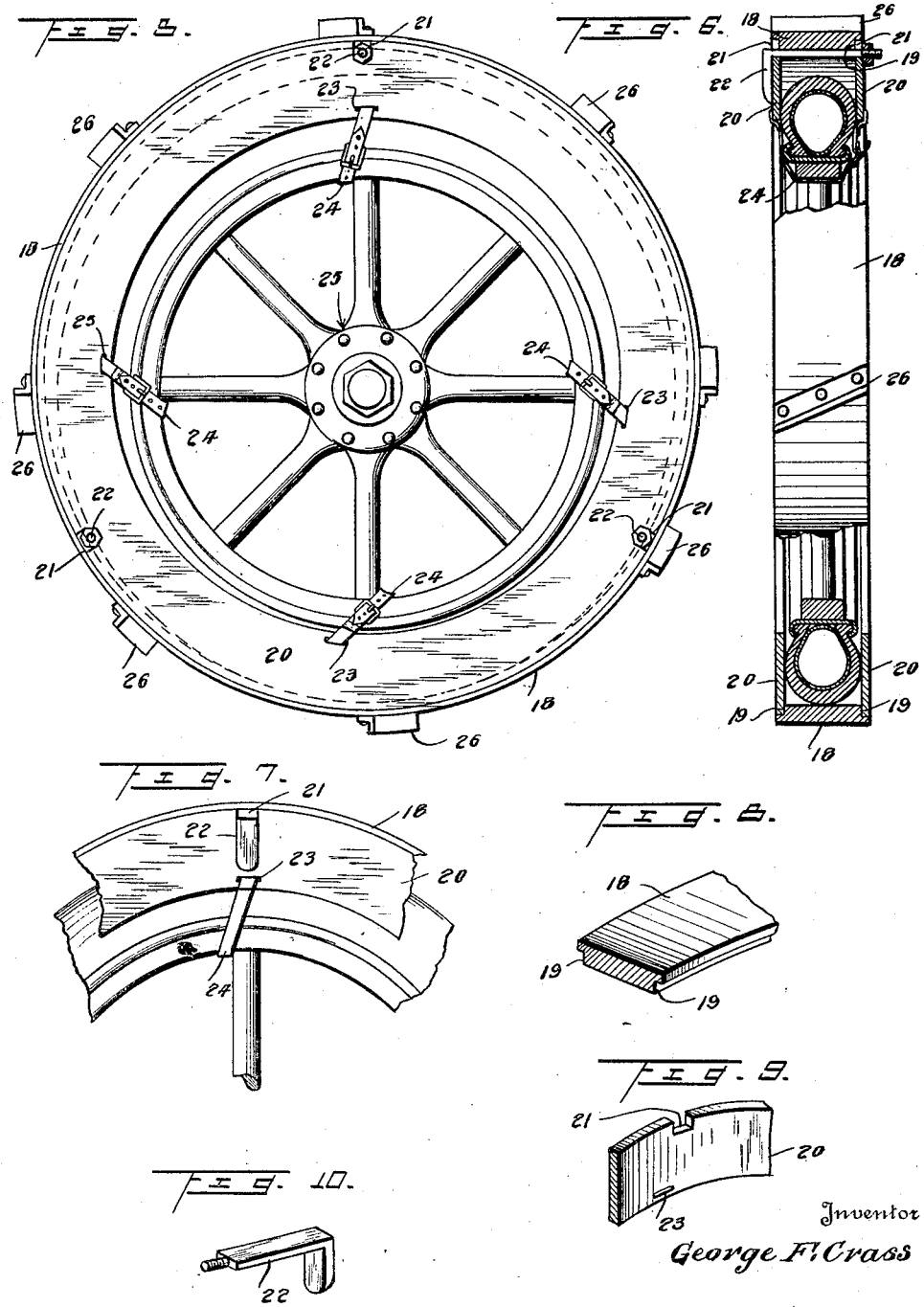

1,478,847

UNITED STATES PATENT OFFICE.

GEORGE F. CRASS, OF ITHACA, NEW YORK, ASSIGNOR OF ONE-HALF TO JOHN H. McCORMICK, OF ITHACA, NEW YORK.

NONSKID DEVICE FOR AUTOMOBILES.

Application filed April 14, 1923. Serial No. 632,061.

*To all whom it may concern:*

Be it known that I, GEORGE F. CRASS, a citizen of the United States of America, residing at Ithaca, in the county of Tompkins and State of New York, have invented certain new and useful Improvements in Non-skid Devices for Automobiles, of which the following is a specification.

This invention relates to new and useful improvements in non-skid devices for automobile tires.

An important object of this invention is to provide a traction casing adapted for encircling a pneumatic tire or the like to better adapt the same for travel over snow-covered or muddy road beds.

A further object of the invention is to provide a rigid traction casing of greater diameter than the tire upon which it is applied for the purpose of allowing relative vertical movement between the two, thereby enabling the automobile employing the device to derive the benefit of the cushioning support furnished by the pneumatic tire.

Other objects and advantages of the invention will be apparent during the course of the following description.

In the accompanying drawings forming a part of this specification and in which like numerals are employed to designate like parts throughout the same, Figure 1 is a side elevational view showing an automobile wheel and tire with a form of the non-skid device embodied in this invention, applied thereto, Figure 2 is a front elevational view, partly broken away, of the assembled device shown in Fig. 1, Figure 3 is a fragmentary plan view of the device shown in Figs. 1 and 2, Figure 4 is a fragmentary detail view of the securing means employed for retaining the device in position upon a wheel and tire, Figure 5 is a side elevational view of a slightly modified form of the invention, Figure 6 is a front elevational view, partly broken away, of the assembled device shown in Fig. 5, Figure 7 is a fragmentary detail view showing the securing means employed for retaining the modified form shown in Figs. 5 and 6 in position upon a wheel and tire, Figure 8 is a fragmentary perspective view of the tread band employed in the modified form shown in Figs. 5 and 6, Figure 9 is a fragmentary perspective view of one of the side plates embodied in the form shown in Figs. 5 and 6, and Figure 10 is a detail perspective view of the L-shaped clamping bolt employed for properly securing the various parts in their assembled position.

Referring to the accompanying drawings and particularly to Figs. 1 to 4 inclusive there is shown an automobile wheel 5 having the usual spokes 6 and felly 7, the said wheel being provided with the well known type of penumatic tire 8, as shown. The traction casing shown in operative position upon the wheel 5 consists of a one-piece tread band or plate 9 that is of greater diameter than the wheel and tire upon which it is to be applied, there being further provided annular side plates 10 that are formed with regularly spaced lugs 11 for receiving the clamping bolts 12 that are provided for retaining the various parts in their proper assembled positions. Pivotally secured to the clamping bolts 12 and positioned outwardly of the side plates 10 are straps 13 having pivotally connected to their free ends a cross pin 14 adapted for carrying a roller member 15, the clamping bolts 12 being further provided for securing in position the diagonally extending cross chains 16. It is to be understood that any number of these sets of side straps 13 and roller members 15 may be employed notwithstanding the fact that they are only shown associated with every other clamping bolt 12 in Fig. 1 of the drawings. The diagonally extending cross chains 16 are preferably provided for the entire periphery of the shell thereby preventing spinning of the wheels on slippery pavements or side skidding of the automobile employing this device. The side straps 13 are provided of proper lengths to accommodate the vertical separation of the wheel from the tread band 9 while the device is travelling over the ground, it being understood that there will at all times be one roller 15 in engagement with the felly 7 and one spoke 6 for preventing spinning of the vehicle wheel within the casing.

Referring particularly to Figs. 5 to 10 inclusive, there is shown a modified form of traction casing which consists of the annular tread band 18 that is provided with inner peripheral rabbet edges 19 for receiving the outer peripheral edges of the spaced annular side plates 20. These annular side plates are provided at any desired intervals with notches 21 formed in their outer periphery for the reception of the L-shaped clamping bolts 22 which are provided for retaining the various parts in their proper assembled position. The annular side plates 20 are further provided with spaced slots 23 for receiving the straps 24 employed for operatively connecting the wheel 25 with the traction casing. It is to be understood that this entire casing is of greater diameter than the tire upon which it is to be positioned and that the straps 24 are of sufficient length to allow for the separation of the tire from the inner periphery of the tread band 18 during its travel over a roadbed, they will, however, properly engage the wheel felly and spokes for preventing spinning of the tire within the casing. The tread band 18 is provided at any desired spaced intervals with diagonally positioned calks 26 for preventing spinning or skidding of the casing upon a muddy or snow-covered roadbed.

It is believed that the construction and assembly of the various parts embodied in the two forms of traction casings shown in the accompanying drawings will be completely understood from the above detailed description, therefore, no further explanation is deemed necessary.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a traction casing for pneumatic tires, an annular tread band, independent annular side plates having radially outwardly projecting lugs, said side plates engaging opposite side edges of said band, clamping bolts for connecting the side plates extending between said lugs and traversing the tread band outwardly thereof, and means for retaining said casing in position upon said tire.

2. In a traction casing for pneumatic tires, an annular tread band, independent annular side plates having radially outwardly projecting lugs, said side plates engaging opposite side edges of said band, the lugs on one plate being transversely alined with the lugs on the other plate, clamping bolts extending between alined lugs positioned outwardly of the tread surface of said band, flexible traction increasing elements carried by the opposite ends of adjacent clamping bolts, and means pivotally carried by said clamping bolts for retaining said casing in position upon said tire.

In testimony whereof I affix my signature.

GEORGE F. CRASS.